(12) United States Patent
Fischer et al.

(10) Patent No.: US 6,390,558 B2
(45) Date of Patent: May 21, 2002

(54) SEAT FOR A MEANS OF TRANSPORT

(75) Inventors: Harald Fischer, Unterensingen; Heiko Malsch, Heiningen; Peter Risch, Mannheim, all of (DE)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 09/728,206

(22) Filed: Dec. 1, 2000

(30) Foreign Application Priority Data

Dec. 1, 1999 (DE) ......................................... 199 57 793

(51) Int. Cl.$^7$ ............................. A47C 1/036; B60N 7/48
(52) U.S. Cl. ..................... 297/410; 297/61; 297/378.12
(58) Field of Search ....................... 297/61, 410, 378.12

(56) References Cited

U.S. PATENT DOCUMENTS 5,918,940 A * 7/1999 Wakamatsu ................. 297/410
6,192,565 B1 * 2/2001 Tame ........................... 297/61

FOREIGN PATENT DOCUMENTS

DE          195 29 233 A1    2/1997

\* cited by examiner

*Primary Examiner*—Anthony D. Barfield
(74) *Attorney, Agent, or Firm*—MacMillan, Sobanski & Todd, LLC

(57) ABSTRACT

A seat for a means of transport, in particular a vehicle seat, comprising a seat part, a backrest, a backrest adjustment system (1) which connects the backrest to the seat part and which permits a forward pivoting of the backrest onto the seat part, a height adjustable headrest which is displaceably guided via at least one guide rod (10) in an associated guide receiver (11) in the backrest, and retaining means (30, 31) which are effective between at least one guide rod (10) and the associated guide receiver (11) and through which the guide rod (10) is releaseably fixable at different heights against displacement, wherein, for avoiding a collision of the headrest with the vehicle roof, the guide receiver (11) for the guide rod (10) is formed so as to be retractable together with the guide rod (10) opposite to the extension direction (VI) of the headrest inwards into the backrest into a recessed position and back out again while the guide rod (10) is arrested by the retaining means (30, 31) relative to the guide receiver (11); and wherein means are provided through which an automatic inward movement of the guide receiver (11) is caused by the forward pivoting of the backrest and an automatic outward movement of the guide receiver (11) back into its original position is caused when the backrest is pivoted back.

21 Claims, 5 Drawing Sheets

SEAT FOR A MEANS OF TRANSPORT

CROSS REFERENCE TO RELATED APPLICATIONS

This application claims priority to German Patent Application No. 19957793.5 filed Dec. 1, 1999.

BACKGROUND OF THE INVENTION

The present invention relates to a seat for a means of transport, in particular a vehicle seat, comprising a seat part, a backrest, a backrest adjustment system which connects the backrest to the seat part and which permits a forward pivoting of the backrest onto the seat part, a height adjustable headrest which is displaceably guided via at least one guide rod in an associated guide receiver in the backrest, and retaining means which are effective between at least one guide rod and the associated guide receiver and through which the guide rod is releasably fixable at different heights against displacement.

In two-door motor vehicles, the backrests of the front seats are usually made to pivot forwardly to make it easier to get into the back seats. In vehicles with a low height such as sports cars, the headrest can come into contact with the vehicle roof or the sun visor during this movement. The forward pivoting of the backrest can be made more difficult or even prevented in this way. The set height of the headrest can also be changed.

SUMMARY OF THE INVENTION

It is the object of the invention to provide a seat of the kind initially mentioned in which these problems do not occur and wherein in particular contact between the headrest and the vehicle roof should be avoided during the forward pivoting of the backrest.

This object is satisfied by the guide receiver for the guide rod being formed so as to be retractable together with the guide rod opposite to the extension direction of the headrest inwards into the backrest into a recessed position and back out again while the guide rod is arrested by the retaining means relative to the guide receiver and by means being provided through which an automatic inward movement of the guide receiver is caused by the forward pivoting of the backrest and an automatic outward movement of the guide receiver back into its original position is caused when the backrest is pivoted back.

Due to the automatic inward movement of the guide receiver while the backrest is pivoted forwardly, a low position of the headrest is also achieved when this was previously set to a greater height. Contact of the headrest with the vehicle roof during the forward pivoting of the backrest can thereby be effectively prevented. The headrest can be retracted so far until the headrest contacts the upper side of the backrest, that is possibly further than its lowest setting position in which the headrest still has a small spacing to the upper side of the backrest. The amount the headrest protrudes upwardly over the backrest is thereby reduced to a minimum so that contact with the vehicle roof can also be avoided with very low vehicles. The guide receiver is here also stopped via the retaining means so that the set headrest height does not change.

The inward movement of the guide receiver with the guide rods being held in place by the retaining means with respect to the guide receiver, at the same time ensures that the headrest position does not change relative to the guide receiver during retraction. When the guide receiver is again extended back into its starting position, the previously set headrest position is therefore again reached. Thus, no new setting is required. Nevertheless, the setting capability of the headrest height is maintained without restriction over the whole setting range.

In accordance with an embodiment of the invention, at least one force deflection system having a flexible force transmission element is active between the backrest adjustment system and the guide receiver for the retraction and/or extension of the guide receiver. A Bowden cable can in particular serve to move the guide receiver inwardly and/or outwardly. Such a system requires little construction effort and can be accommodated in the seat in a space-saving manner. Moreover, due to the flexibility of the force transmission element, it allows a combination with an active head rest system in which the headrest is moved from its normal position into a position displaced upwardly and forwardly in the event of a rear-end impact.

The force transmission element preferably acts on the guide receiver in the extension direction while an elastic return device is provided which acts on the guide receiver in the retraction direction. The construction effort is reduced by the use of an elastic return device and the return force is advantageously supported by gravity since the return device acts on the guide receiver in the retraction direction, that is approximately in the direction of gravity. The return element can be given lower dimensions as a result. However, the reverse arrangement is also possible.

It is also preferred for the one end of the inner cable of the Bowden cable to be fixed to a stationary backrest part and for the associated end of the sleeve of the Bowden cable to be fixed to the guide receiver. A reverse arrangement is also possible here. The other end of the sleeve of the Bowden cable is in particular fixed to a stationary part of the backrest adjustment system and the other end of the inner cable is fixed to a part of the backrest adjustment system which is movable with the backrest when this is pivoted forwardly, with this end of the inner cable being attached to the movable part of the backrest adjustment system in such a way that the Bowden cable is relieved when the backrest is pivoted forwardly. This means that the Bowden cable is stressed at the normal backrest position and its sleeve fixes the guide receiver in its topmost position. When the backrest is pivoted forwardly, the Bowden cable is relieved and the return element can move the guide receiver into a recessed position.

In accordance with a further embodiment of the invention, the end of the inner cable at the backrest adjustment system side is attached to a slide block which is displaceably guided between two end positions in a slide track arranged on a stationary part of the backrest adjustment system, with the slide block being moved to and fro between its two end positions by a part of the backrest adjustment system moved by the backrest when this is pivoted forwardly. A pressure element is in particular arranged at the moved part of the backrest adjustment system, said pressure element holding the slide block in its end position in which the Bowden cable is stressed when the backrest is in its upright position and successively releasing the slide block when the backrest is pivoted forwardly so that the slide block can move into its other end position.

The movement of the Bowden cable is advantageously limited by the slide track. Together with the pressure element, the advantage also results that the backrest has a freewheel mechanism during pivoting forward. That is, the backrest can be completely pivoted forwardly without any impediment by the Bowden cable even when the inward movement of the guide receiver has already been stopped. The slide block, namely, then comes to stop at its position in the slide track and the pressure element moves away therefrom. When the backrest is pivoted back, the pressure element then acts on the slide block again from a certain inclination of the backrest and moves it back into its starting position in which the Bowden cable is stressed.

This is in particular of advantage when, in accordance with a further embodiment of the invention, a path multiplier is arranged between the backrest adjustment system and the guide receiver, said path multiplier translating a small pivot angle of the backrest into a large path of the guide receiver for the headrest. With this embodiment, it can be achieved that a small forward-pivot angle of the backrest, in particular an angle of approximately 15°, already results in the complete retraction of the headrest, even when set to its highest position. It is thus reliably ensured that the headrest does not come into contact with either the vehicle roof or a visor which may possibly be turned down.

The transmission ratio can also be selected such that it changes with the pivot angle of the backrest. The inward movement of the headrest can thus be effected in a slower manner at the start and/or end stage in order to protect the system components against too great a strain.

Two Bowden cables are preferably provided whose one end is in each case fixed to the path multiplier and whose other end is fixed to the guide receiver or the backrest adjustment system. A path multiplication between the pivot angle of the backrest and the displacement path of the guide receiver can be realised in a very simple manner in this way.

In accordance with a further embodiment of the invention as a path multiplier, a transmission can in particular be provided which comprises two coaxially journalled rotating wheels which are connected to one another in a rotationally fixed manner, which have different diameters to one another and where the one end of the inner cables of the two Bowden cables is respectively fixed in place on the periphery of said rotating wheels such that the inner cables of the two Bowden cables can be wound onto and off the rotating wheels in opposite directions. Such a step-up gear is low in construction effort and reliable in operation in combination with a Bowden cable.

In accordance with a further embodiment of the invention a spring actuator can be provided between the backrest adjustment system and the guide receiver. Excessive strain on the system parts can also be avoided by such a spring actuator. It is also generally possible with such a spring actuator as an alternative to the arrangement with slide block and pressure element to compensate for different headrest heights before retraction into the guide receiver.

In accordance with a further embodiment of the invention, a sleeve is provided in which the guide receiver is displaceably guided and which is fixable in the backrest, with the guide receiver in particular forming an inner sleeve into which a guide rod is insertable and fixable at different heights and which is itself displaceable in the outer sleeve stationary on the backrest. A compact arrangement with a reliable function can be provided in this way.

One end of the sleeve of a Bowden cable preferably acts on the guide receiver and the associated end of the inner cable of said Bowden cable acts on the sleeve, with a spring acting between the sleeve and the guide receiver and loading the guide receiver in the retraction direction. This results in a system which can be installed completely into a backrest of a vehicle seat, with the sleeve being attachable to the backrest by conventional means, for example by latching. The use of a sleeve ensures a reliable and repeatable inward and outward movement of the guide receiver.

In accordance with a further embodiment of the invention, an abutment for the lower end of the guide rod is provided which limits the inward movement of the guide rod and thus of the guide receiver. In this way, the headrest can be moved into a desired retraction position which is independent of the actual backrest when the backrest is pivoted forwardly.

In accordance with a further embodiment of the invention, the headrest is automatically adjustable to a minimum height while the guide receiver is moving inwardly. This can be effected in particular by the retaining means acting between the guide receiver and the guide rod being made automatically releasable over a certain range. For example, a mechanical latching in this range can act only in one direction so that the guide receiver can still be further retracted by a certain number of latch positions when the headrest abuts its lowest position. It is achieved in this way that when the headrest is extended again, it returns to at least a height which ensures a sufficient protective effect for the greater majority of the population.

In accordance with a further embodiment of the invention, the guide receiver can be extended out of the backrest as part of an active head support system together with the guide rod in the event of a rear-end impact and into such a position that the headrest is brought into a forwardly and upwardly displaced position. The headrest retraction in accordance with the invention can thus be advantageously combined with such an active head support system which offers additional safety, with the guide receiver preferably being extendable out of the backrest by an outward movement of the sleeve. This requires little construction effort and can be combined particularly well with existing active head support systems.

DETAILED DESCRIPTION OF THE INVENTION

Figure 1:
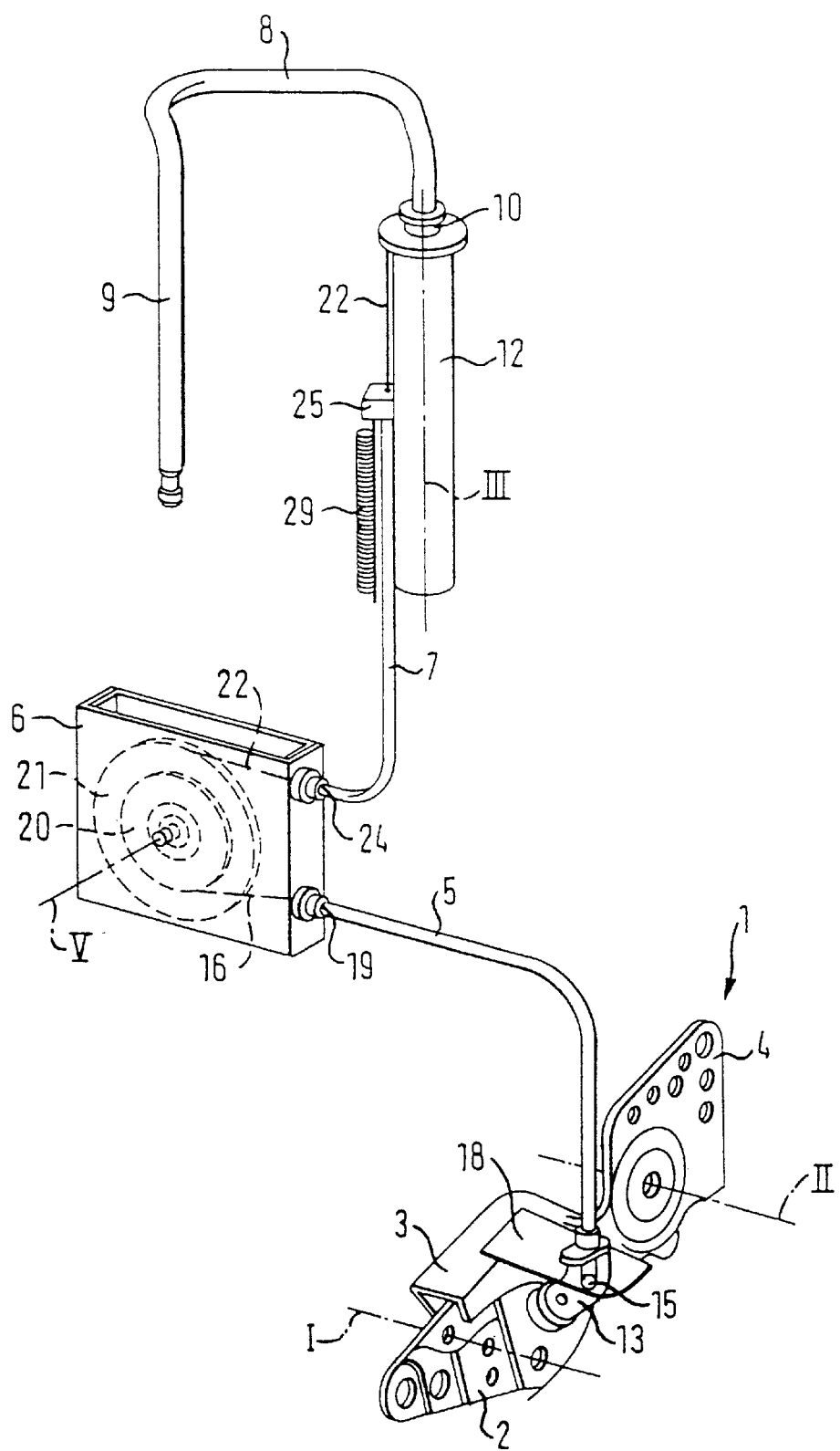
FIG. 1 a perspective representation of an arrangement in accordance with the invention.

FIG. 1 shows the substantial functional elements of a seat in accordance with the invention, namely a backrest adjustment system 1 comprising a first adjustment part 2 fixable to a seat part (not shown), a second adjustment part 3 mounted pivotally around an axis I on the first adjustment part 2 and a third adjustment part 4 arranged pivotally around an axis II on the second adjustment part 3, said third adjustment part 4 being fixable to a backrest of a seat (also not shown). While the backrest inclination can be set by a turning of the third adjustment part 4 relative to the second adjustment part 3, the turning capability of the second adjustment part 3 relative to the first adjustment part 2 allows a pivoting forwardly of the backrest down onto the seat part, said backrest being able to be fixed in place in its upright position by releasable means (not shown).

Figure 2:
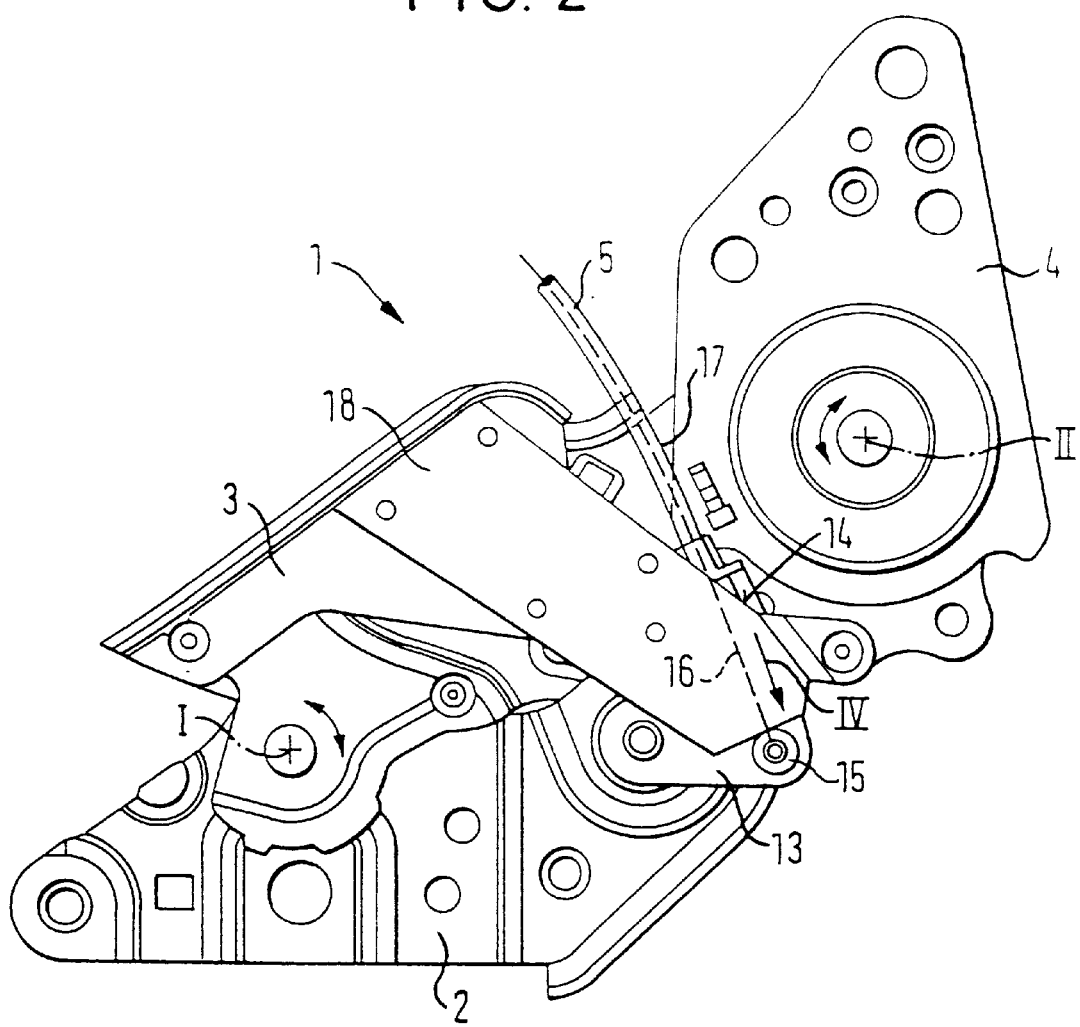
FIG. 2 a side view of a part of FIG. 1 in a magnified representation.

The end of a Bowden cable 5 is attached to the second adjustment part 3 in the manner shown in detail in FIG. 2.

Figure 3:
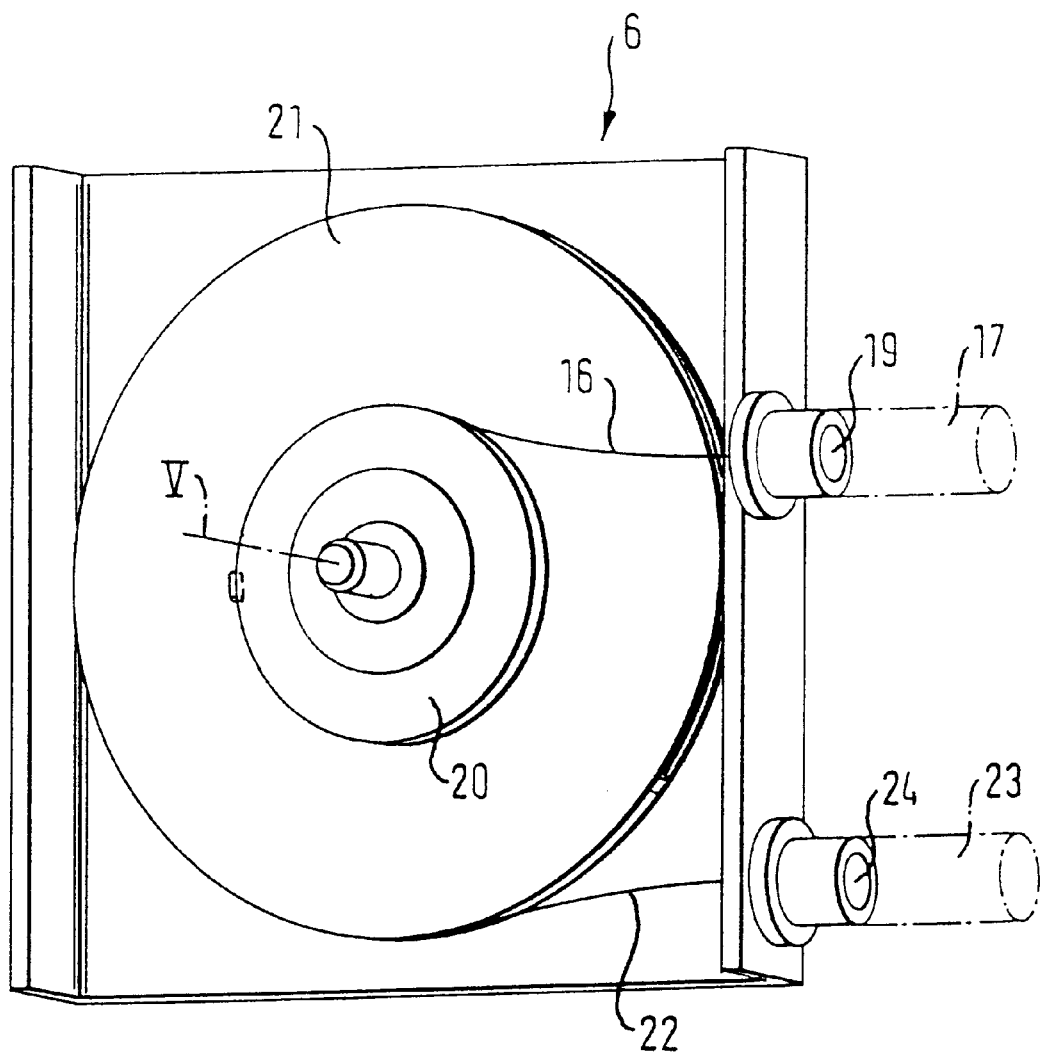
FIG. 3 a detailed representation of another part of FIG. 1.

The other end of the Bowden cable 5 is connected to a step-up gear 6 which is shown in more detail in FIG. 3. The one end of a second Bowden cable 7 is furthermore connected to the step-up gear 6, with the other end acting on a headrest of which here only the two guide rods 9, 10 are shown which are connected to one another via a transverse brace 8. While the first guide rod 9 of the headrest is received in a guide (not shown) in the backrest of a seat in a conventional manner, the second guide rod 10 engages into a guide receiver 11 which is displaceably guided in a sleeve 12 in the direction of its longitudinal axis III, as shown in detail in FIGS. 4 and 5.

As can be seen in particular in FIG. 2, a slide 13 is provided at the first adjustment part 2 of the backrest adjustment system 1 and comprises a slide track 14 in which a slide block 15 is inserted. One end of the inner cable 16 of the first Bowden cable 5 is attached to the slide block 15, while the associated end of the sleeve 17 of the Bowden cable 5 is connected to the slide 13 at the one end of the slide track 14. Furthermore, a free end of a return plate 18 attached to the second adjustment part 3 acts on the slide block 15 in the extension direction IV of the inner cable 16. The inner cable 16 of the Bowden cable 5 is thereby moved between a pulled-out and a non-pulled position when the second adjustment part 3 is pivoted.

The other end of the sleeve 17 of the Bowden cable 5 is, as is shown in FIG. 3, attached to a first inlet opening 19 of the step-up gear 6. The associated end of the inner cable 16 of the Bowden cable 5 is led through the opening 19 and fixed to a first rotating wheel 20 such that the inner cable 16 is wound onto or off the periphery of the first rotating wheel 20 when the rotating wheel 20 is rotated around the axis of rotation V.

A second rotating wheel 21 is rotationally fixedly connected to the first rotating wheel 20 is mounted pivotally around the same axis V and has a greater diameter than the first rotating wheel 20. The one end of the inner cable 22 of the second Bowden cable 7 is fixed to the second rotating wheel 21 such that the second inner cable 22 is wound onto or off the periphery of the rotating wheel 21 when the rotating wheel 21 is rotated around the axis V, said winding on or off being in the opposite direction to the winding of the first inner cable 16 on the first rotating wheel 20. The sleeve 23 of the second Bowden cable 7 is supported in this at a second through passage 24 via which the inner cable 22 of the second Bowden cable 7 is guided into the transmission 6. As can be seen, pulling the inner cable 16 of the first Bowden cable from the first rotating wheel 20 results in a winding up of the inner cable 22 of the second Bowden cable 7 due to the opposite winding orientation, with the wound up length of the inner cable 22 being larger than the pulling off length of the inner cable 16 of the first Bowden cable 5 corresponding to the different diameters of the two rotating wheels 20 and 21. This results in the realisation of a path multiplication between the first Bowden cable 5 and the second Bowden cable 7 which is, for example 3:1.

Figure 4:
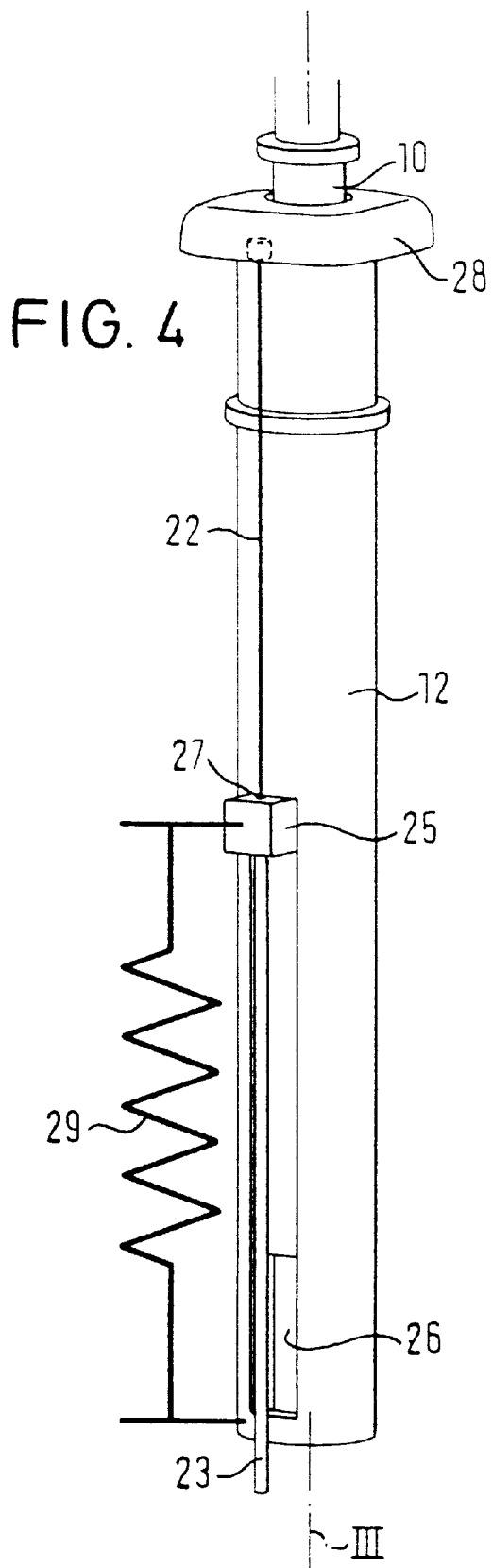
FIG. 4 a magnified representation of a further part of FIG. 1.
Figure 5:
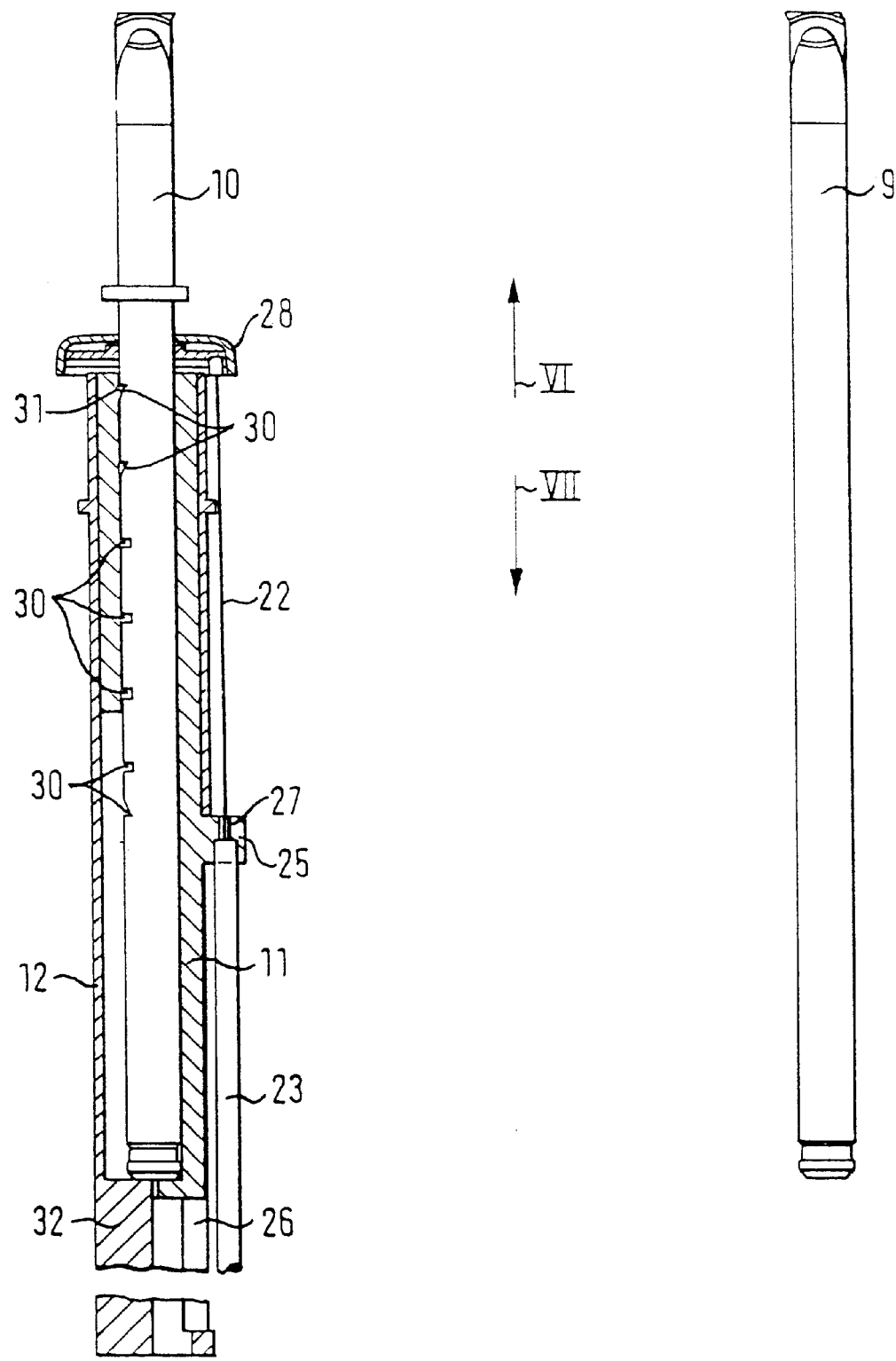
FIG. 5 a partly sectioned representation of a further part of FIG. 1.

The other end of the sleeve 23 of the second Bowden cable 7 acts on the guide receiver 11 for the second guide rod 10, as can be seen in particular in FIGS. 4 and 5. The guide receiver 11 resting in the sleeve 12 has a nose 25 for this which extends through an elongate opening 26 in the wall of the sleeve 12 and which is provided with a passage aperture 27 through which the inner cable 27 of the second Bowden cable 7 extends whose second end is attached to a bead 28 at the upper end of the sleeve 12. The nose 25 thus forms an upper abutment for the movement of the guide receiver 11 in the sleeve 12.

Furthermore, a tension spring 29 acts on the nose 25 and is supported at its other end on the lower end of the sleeve 12. In FIG. 4, the tension spring 29 is shown purely schematically outside the sleeve 12 in order to illustrate its function. In actual fact, however, the tension spring 29 is located inside the sleeve 12.

The guide receiver 11 is biased in the direction of the lower end of the sleeve 12 by the tension spring 29. The movement of the guide receiver 11 in the sleeve 12 in the direction of its longitudinal axis III is downwardly limited by the sleeve 23 of the second Bowden cable 7 which acts on the nose opposite to the force of the tension spring 29. The guide receiver 11 can only move downwardly by so far as the inner cable 22 is released by the transmission 6.

The sleeve surface of the guide rod 10 displaceably guided in the guide receiver 11 has latch recesses 30 into which latching means 31 are latchable which are arranged in the upper end region of the guide receiver 11, with the latching means 31 being unlatchable from the latch recesses 30 against the force of a return device via actuating means (not shown). In this way, the guide rod 10 can be adjusted in height relative to the guide receiver 11 in order to set a desired headrest height.

Whereas the four bottommost latch recesses 30 are designed, as can be seen in FIG. 5, such that they block a movement of the guide rod 10 both in the extension direction VI and in the retraction direction VII, the two topmost latch recesses 30 in the guide rod 10 are formed such that the latching means automatically unlatch when a force is applied to the guide rod 10 in the extension direction VI or to the guide receiver 11 in the retraction direction VII, but block in the opposite direction. As a result, the guide rod 10 can automatically be notched up by two latch stages via an abutment 32 on the lower end of the sleeve 12 when the guide rod 10 is located in its lowest position relative to the guide receiver 11 as this moves inwardly. If it is already notched up one stage, it is only notched up a further one stage during retraction. The abutment 32 is not active in any other latch stages.

The operation of the apparatus presented is as follows: The tension spring 29 loads the guide receiver 11 in the retraction direction VII, whereby the second Bowden 7 cable is stressed. The tension of the second Bowden cable 7 is transmitted to the first Bowden cable 5 via the step-up gear 6, with said first Bowden cable 5 being fixed by the return plate 18. The whole system is therefore under the stress of the tension spring 29.

If the backrest of the seat is now pivoted forwardly down onto the seat part, then the second adjustment part 3 of the backrest adjustment system 1 pivots around the axis I relative to the first adjustment part 2 and takes the return plate 18 along with it whose free end moves away from the slide block 15 opposite to the direction IV. Due to the tension of the tension spring 29 acting on the first Bowden cable 5, the inner cable 16 of the first Bowden cable 5 pulls the slide block 15 along the slide track 14 behind the return plate 18. The retracted length of the inner cable 16 allows the step-up gear 6 to rotate around the axis V, whereby the inner cable 16 is wound onto the first rotation wheel 20 and the inner cable 22 of the second Bowden cable 7 is wound down off the second rotating wheel 21. The tension spring 29 can displace the sleeve 23 of the second Bowden cable 7 in the retraction direction VII corresponding to the length of the inner cable 22 wound off and take the guide receiver 11 along while doing so. The guide rod 10 of the headrest latched with the guide receiver 11 is moved into the sleeve 12 together with the guide receiver 11 so that the headrest is lowered.

If the backrest is fully pivoted forwardly downwardly, the movement of the inner cable 16 of the first Bowden cable 5 is limited by the end of the slide track 14. The inward movement of the guide receiver 11 is also limited in this way via the released length of the inner cable 22 of the second Bowden cable 7. This end position is preferably reached already after a pivot angle of the backrest of approximately 15°. That is, the slide block 15 abuts the end of the slide track 14 already after a pivoting of the backrest of only 15° and the guide receiver 11 is completely retracted due to the multiplication of the step-up gear 6.

When the back rest is pivoted back again, the second adjustment part 3 pivots back around the axis I into its starting position. The return plate 18 moved along with this motion again comes into engagement with the slide block 15 at the end of the movement and displaces it along the slide track 14 into its starting position. The inner cable 16 of the first Bowden cable 5 is pulled out of its sleeve 17 by the slide block 15 so that the inner cable 16 is pulled down from the first rotating wheel 20 of the step-up gear 6. The first rotating wheel 20 is thereby set into rotation around the axis V, with the second rotating wheel 21 in a fixed connection to the first rotation wheel 20 being turned along. As a result of the opposite direction of winding of the inner cable 16 of the first Bowden cable 5 and the inner cable 22 of the second Bowden cable 7, the inner cable 22 of the second Bowden cable 7 is wound onto the second rotating wheel 21 when the inner cable 16 is wound off. Consequently, the sleeve 23 of the second Bowden cable 7 is displaced in the direction of the other end of the inner cable 22 of the second Bowden cable 7, with the sleeve 23 taking along the nose 25 of the guide receiver 11 which is thereby also moved into its starting position in which the nose 25 abuts the upper end of the elongate recess 26. The guide rod 10, latched with respect to the guide receiver 11, is also moved into its starting position with the guide receiver 11 and the headrest is moved out to its original height.

The initially set height of the headrest is therefore maintained during the retraction and the repeated extension of the headrest. In the variant shown in FIG. 5, the headrest is only notched up one or two latch positions when it is located in the lowest or second-lowest latch position and the backrest is pivoted forwardly downwardly, that is the guide receiver 11 is moved inwardly. However, it is also possible to omit this upward notching so that the headrest set to the lowest or second-lowest position also extends again into this position.

With a seat having an active head support system, the headrest can be extended into a position upwardly and forwardly displaced in a conventional manner in the event of a rear-end impact despite the retraction apparatus in accordance with the invention. This is made possible by the use of a force deflection system with a flexible force transmitting element for the retraction and/or repeated extension of the headrest. This namely allows an enlargement of the distance between the headrest and the actuating system at the backrest adjustment system. In the embodiment shown, only the Bowden cables 5 and/or 7 must have a corresponding length.

To avoid excessive stresses, the Bowden cable 5 can be provided with a spring actuator. This also makes an adjustment of the Bowden cables unnecessary.

The invention provides a seat with a headrest which is automatically retractable when the backrest of the seat is pivoted forwardly in order to avoid a collision with the vehicle roof or a sun visor. The design is simple and advantageously effects a return of the headrest to its originally set height. The system therefore has a memory function for the headrest height. The system can advantageously also be used with seat having an active head support system. The normal adjustment of the headrest height can be carried out manually or automatically, in particular electrically.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A seat for a means of transport, in particular a vehicle seat, comprising a seat part, a backrest, a backrest adjustment system which connects the backrest to the seat part and which permits a forward pivoting of the backrest onto the seat part, a height adjustable headrest which is displaceably guided via at least one guide rod in an associated guide receiver in the backrest, and retaining means which are effective between at least one guide rod and the associated guide receiver and through which the guide rod is releasably fixable at different heights against displacement, characterised in that the guide receiver for the guide rod is formed so as to be retractable together with the guide rod opposite to an extension direction of the headrest inwards into the backrest into a recessed position and back out again while the guide rod is arrested by the retaining means relative to the guide receiver; and in that means are provided through which an automatic inward movement of the guide receiver is caused by the forward pivoting of the backrest and an automatic outward movement of the guide receiver back into its original position is caused when the backrest is pivoted back.

2. A seat in accordance with claim 1 characterised in that at least one force deflection system having a flexible force transmission element is active between the backrest adjustment system and the guide receiver for the retraction and/or extension of the guide receiver.

3. A seat in accordance with claim 2 characterised in that the force transmission element acts on the guide receiver in the extension direction; and in that an elastic return device is provided which acts on the guide receiver in the retraction direction.

4. A seat in accordance with claim 2 characterised in that at least one Bowden cable is provided as the force deflection system.

5. A seat in accordance with claim 4 characterised in that one end of the inner cable of a Bowden cable is fixed to a stationary backrest part and the associated end of its sleeve is fixed to the guide receiver, or vice versa.

6. A seat in accordance with claim 5 characterised in that one end of the sleeve of a Bowden cable is fixed to a stationary part of the backrest adjustment system and the associated end of its inner cable is fixed to a part of the backrest adjustment system movable with the backrest when it is pivoted forwardly, with this end of the inner cable being attached to the movable part of the backrest adjustment system such that the Bowden cable is relieved when the backrest is pivoted forwardly.

7. A seat in accordance with claim 6 characterised in that the end of the inner cable at the backrest adjustment system side is attached to a slide block which is displaceably guided between two end positions in a slide track arranged on a stationary part of the backrest adjustment system; and in that the slide block is moved between its two end positions by a part of the backrest adjustment system moved when the backrest is pivoted forwardly.

8. A seat in accordance with claim 7 characterised in that a pressure element is arranged on the moved part of the backrest adjustment system, said pressure element holding the slide block in its end position, in which the Bowden cable is stressed, when the backrest is in the upright position, and successively releasing the slide block when the backrest is pivoted forwardly so that it can move into its other end position.

9. A seat in accordance with claim 6 characterised in that a multiplier ratio is selected such that a relatively small angle of forward pivoting of the backrest already results in the full retraction movement of a headrest, even of a fully extended headrest.

10. A seat in accordance with claim 9 characterised in that the small angle is about 15 degrees or less.

11. A seat in accordance with claim 1 characterised in that a path multiplier is arranged between the backrest adjustment system and the guide receiver, said path multipiler translating a small pivot angle of the backrest into a large path of the guide receiver for the headrest.

12. A seat in accordance with claim 11 characterised in that the multiplier ratio is selected such that it changes with the pivot angle of the backrest.

13. A seat in accordance with claim 11 characterised in that two Bowden cables are provided whose one end is in each case fixed to the path multiplier and whose other end is fixed to the guide receiver or the backrest adjustment system.

14. A seat in accordance with claim 13 characterised in that a transmission is provided as the path multiplier and comprises two coaxially journalled rotating wheels which are connected to one another in a rotationally fixed manner and which have different diameters, with the one end of the inner cables of the two Bowden cables being respectively fixed in place on the periphery of the wheels such that the inner cables of the two Bowden cables can be wound onto and off the rotating wheels in opposite directions.

15. A seat in accordance with claim 1 characterised in that a spring actuator is provided between the backrest adjustment system and the guide receiver.

16. A seat in accordance with claim 1 characterised in that a sleeve fixable in the backrest is provided in which the guide receiver is displaceably guided.

17. A seat in accordance with claim 16 characterised in that one end of the sleeve of a Bowden cable acts on the guide receiver and the associated end of the inner cable of said Bowden cable acts on the sleeve; and in that a spring is active between the sleeve and the guide receiver, said spring loading the guide receiver in the retraction direction.

18. A seat in accordance with claim 1 characterised in that an abutment is provided for the lower end of the guide rod, said abutment limiting the retraction movement of the guide rod and thus of the guide receiver.

19. A seat in accordance with claim 1 characterised in that when the guide receiver is retracted, the headrest is automatically adjustable to a minimum height relative thereto.

20. A seat in accordance with claim 19 characterised in that the guide receiver can be extended out of the backrest as part of an active head support system together with the guide rod in the event of a rear-end impact and into such a position that the headrest is brought into a forwardly and upwardly displaced position.

21. A seat in accordance with claim 20 charaterised in that the guide receiver can be extended out of the backrest by outward movement of the sleeve.

* * * * *